United States Patent [19]

Bush et al.

[11] Patent Number: 4,578,920

[45] Date of Patent: Apr. 1, 1986

[54] SYNCHRONOUSLY DEPLOYABLE TRUSS STRUCTURE

[75] Inventors: Harold G. Bush, Yorktown; Martin M. Mikulas, Jr., Poquoson; Richard E. Wallsom, Newport News, all of Va.

[73] Assignee: The United States of America as represented by the secretary of the United States National Aeronautics and Space Administration, Washington, D.C.

[21] Appl. No.: 556,512

[22] Filed: Nov. 30, 1983

[51] Int. Cl.[4] ...................... E04H 12/18; H01Q 15/20
[52] U.S. Cl. ......................................... 52/645; 52/111; 52/648; 244/159; 244/173; 343/881; 343/882; 343/915; 343/DIG. 2; 403/64; 403/170
[58] Field of Search .................. 403/64, 102, 170, 171, 403/172, 176; 244/158 R, 159, 173; 343/880, 881, 882, 915, DIG. 2; 52/105, 109, 111, 117, 121, 632, 638, 641, 645, 646, 648, 651, 652

[56] References Cited

U.S. PATENT DOCUMENTS

| 947,790 | 2/1910 | Carter | 135/28 |
|---|---|---|---|
| 2,008,465 | 7/1935 | Norris et al. | 135/28 |
| 2,940,709 | 6/1960 | Neuwirth | 403/171 |
| 3,618,111 | 11/1971 | Vaughan | 343/915 |
| 3,830,031 | 8/1974 | Soisson | 52/645 |
| 3,913,105 | 10/1975 | Williamson et al. | 52/646 |
| 3,968,808 | 7/1976 | Zeigler | 52/81 |
| 4,285,609 | 8/1981 | Runyon | 403/172 |
| 4,337,560 | 7/1982 | Slysh | 52/646 |
| 4,370,073 | 1/1983 | Ohme | 403/172 |
| 4,482,900 | 11/1984 | Bilek et al. | 343/915 |

FOREIGN PATENT DOCUMENTS

| 052258 | 5/1982 | European Pat. Off. | 135/26 |
|---|---|---|---|
| 1203925 | 2/1958 | Fed. Rep. of Germany | 135/26 |
| 3137108 | 12/1982 | Fed. Rep. of Germany | 52/632 |
| 1206399 | 9/1970 | United Kingdom | 403/170 |

Primary Examiner—John E. Murtagh
Assistant Examiner—Andrew Joseph Rudy
Attorney, Agent, or Firm—Howard J. Osborn; Wallace J. Nelson; John R. Manning

[57] ABSTRACT

A collapsible-expandable truss structure 16 including first and second spaced surface truss layers (18, 20) having an attached core layer 22 is disclosed. The surface truss layers are composed of a plurality of linear struts 40 arranged in multiple triangular configurations with each linear strut being hinged at its center 41 and hingedly connected at each end thereof to a nodular joint 25. A passive spring 64 serves as the expansion force to move the folded struts from a stowed collapsed position to a deployed operative final truss configuration. Damper 62 controls the rate of spring 64 expansion for synchronized deployment of truss 16 as the folded configuration is released for deployment by restraint belts 72a and 73a synchronously extending under the control of motor (71) driven spools 72 and 73.

10 Claims, 9 Drawing Figures

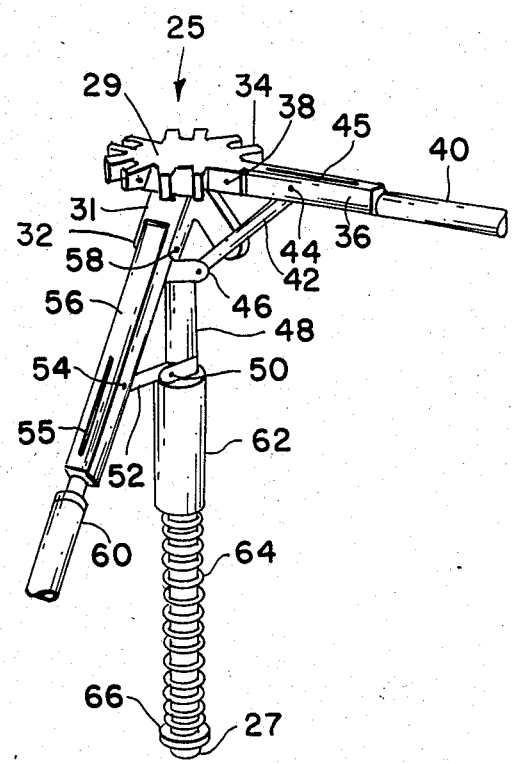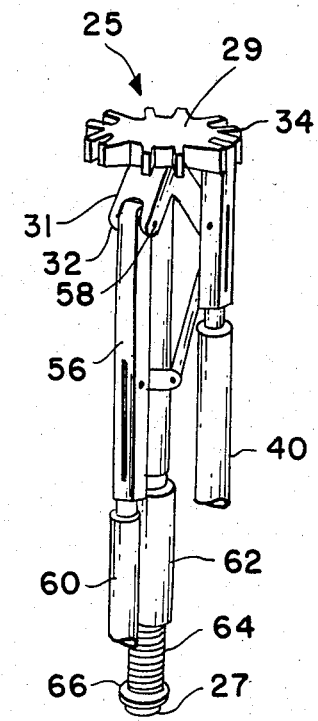
FIG. 3     FIG. 4
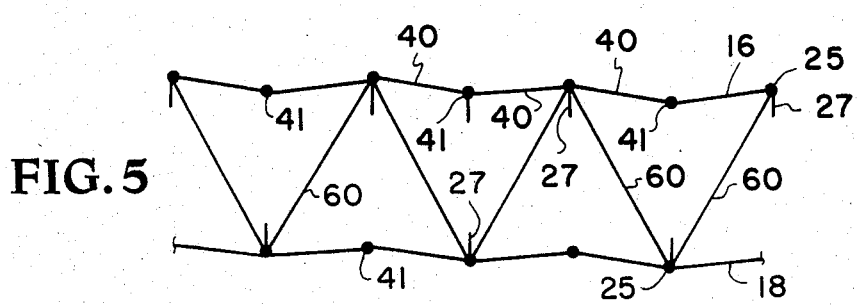
FIG. 5
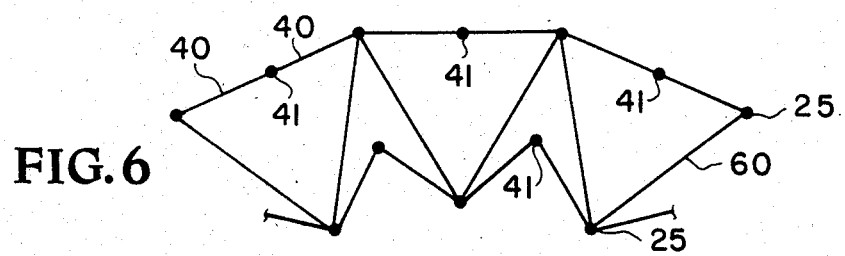
FIG. 6

SYNCHRONOUSLY DEPLOYABLE TRUSS STRUCTURE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

In the continuous exploration and utilization of the spatial environment of Earth, the need for improved large structures in ever increasing. The size of orbital space structures is, at present, limited to the cargo volume of the National Aeronautics and Space Administration's Space Shuttle Vehicle. This vehicle has demonstrated the feasibility and practicality of transporting various payloads for deployment into spatial orbits about Earth. It is now contemplated that larger packages may be transported and multiple segments assembled, expanded and/or added onto previously or subsequently launched payloads. It has previously been demonstrated that folded, compressed, rolled and inflatable payloads may be compactly packaged for transport and expanded when placed in Earth orbit. This procedure has proved especially effective for weather and communication satellites, antennas and the like. Large volume truss structures and the like which can be collapsed for storage and transport in relatively small volume and subsequently deployed at the side of use to envelop large volume and/or form planar, curved and contoured surfaces appear to have valuable future use in space, on Earth and/or on other planets.

Some previously employed expandable truss structures have failed to produce regulation mechanisms between expanding component parts and/or have required external deploying devices. These areal truss structures were thus deployed unconstrained or uncontrolled, or were unfolded by the external devices. Uncontrolled folding (expandable) trusses which are devoid of regulating features may exhibit kinematic anomalies during deployment and "lock-up" or become distorted and prevent attainment of the desired final functional state or configuration. The present invention is intended to utilize and maximize the advantageous features of the prior art systems while minimizing the disadvantages thereof.

It is therefore an object of the present invention to provide a novel collapsible expandable truss structure.

Another object of the present invention is to provide a truss structure that can be compactly stowed and transported and controllably expanded to an operative configuration at the site of use.

A further object of the present invention is the provision of a passive energy source for deploying or unfolding a collapsible truss structure.

A further object of the present invention is to provide a controlled deployment force to an expandable collapsed truss structure.

A further object of the present invention is a process for deploying a collapsed truss structure to an expanded operative mode to serve as a support surface for a reflector, platform, building component or the like.

BRIEF DESCRIPTION OF THE INVENTION

According to the present invention, the foregoing and additional objects are attained by providing two surface truss layers of struts arranged in triangles and the two surfaces connected by angularly disposed "tripods" of equal length core strut members. Each face strut is hinged at each end thereof and at the center length and is adapted to be folded inward or outward. Core struts are hinged at the ends only and all struts are connected at their hinged ends to nodular connectors which provide the deployment and synchronization mechanism for truss erection or deployment at the site of use. Deployment energy is provided by a passive spring positioned about an elongated shaft of the individual nodes (in the preferred embodiment) with energy release being controlled by a suitable damper or escapement mechanism. Force is, thus, controllably applied to a slider mechanism also disposed on the node elongated shaft and effects movement of connected synchronizer links pivotally connected to the face and core struts. The design of the kinematic mechanism results in synchronization of the face and core struts during deployment. The formation of kinematic loops between truss faces using the core and face struts and synchronizer mechanism causes the truss faces to deploy or unfold in a prescribed, controlled synchronous manner, from a position in which all struts are parallel to the position required by the final geometric form of the truss structure.

BRIEF DESCRIPTION OF THE DRAWINGS

A more complete appreciation of the present invention and many of the attendant advantages thereof will be readily apparent as the same becomes better understood with reference to the following detailed description when considered in connection with the accompanying drawings wherein:

FIG. 3 is a more detailed view of component parts of the nodule cluster shown in FIG. 2 with parts thereon omitted in the interest of clarity;

FIG. 4 is a view similar to FIG. 3 illustrating an individual nodule cluster when the struts are in the collapsed or stowed position;

FIG. 5 is a schematic two-dimensional representation of the synchronized deployment sequence of a truss structure having parallel faces and constructed according to the present invention;

FIG. 6 is a schematic view similar to FIG. 5 illustrating unsynchronized deployment of the present invention and resulting in a parabolic final truss configuration;

DETAILED DESCRIPTION OF THE INVENTION

Figure 1:
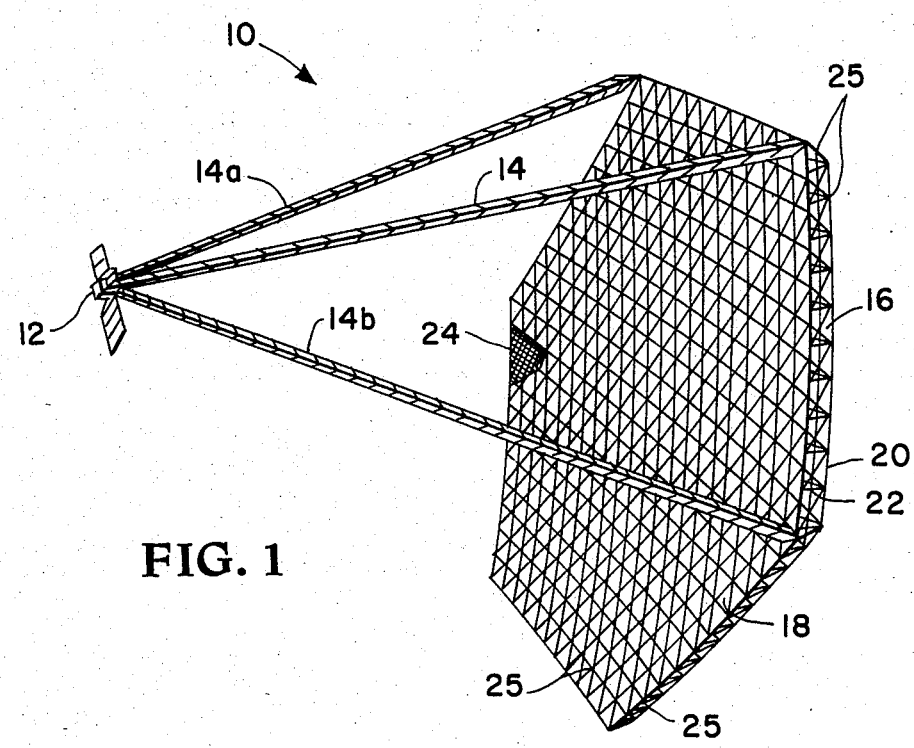
FIG. 1 is a view of a tri-mast deployed antenna system with the truss structure thereof constructed according to the present invention.

Referring now to the drawings and more particularly to FIG. 1, there is shown a tri-mast deployed antenna system utilizing the truss structure of the present invention and generally designated by reference numeral 10. This system includes an antenna feed and electronics unit 12, three support masts 14, 14a and 14b, and the antenna truss and reflector end 16. Each of the masts 14, 14a and 14b and the truss and reflector end 16 are compactly stowed in collapsed state adjacent feed and electronics unit 12 for transport in the space shuttle vehicle or the like from an Earth station to a remote location and deployed in a spatial orbit. As shown in this FIG., truss and reflector end 16 is composed of a plurality of triangular strut frame members on a pair of spaced surface layers 18 and 20 with a core layer 22 of angular struts intermediate of layers 18 and 20 and connected thereto. In the interest of clarity only a portion of the reflective mesh layer 24 is shown in FIG. 1, it being understood that such reflective surface layer may be employed on the exterior surface of one or both layers 18 and 20. A plurality of nodular elements 25 are positioned one each at the points of each triangular frame in surface layers 18 and 20. Nodular elements 25 serve to expand truss and reflector 16 from a stowed, collapsed, transport position to the deployed, expanded, operative position shown in FIG. 1. In the full scale (one hundred meter diameter) configuration illustrated each strut in the triangular segments and the angular struts are approximately fifteen feet (4.57 m) in length and are approximately one-half inch (1.27 cm) in diameter and masts 14, 14a and 14b are formed of similar size struts and in the extended position shown are approximately 150 m length. Expandable/collapsible mast type structures suitable for use with the present invention are described further in NASA Contractor Reports CR-170689 and CR-170690 and are not considered part of the present invention.

Figure 2:
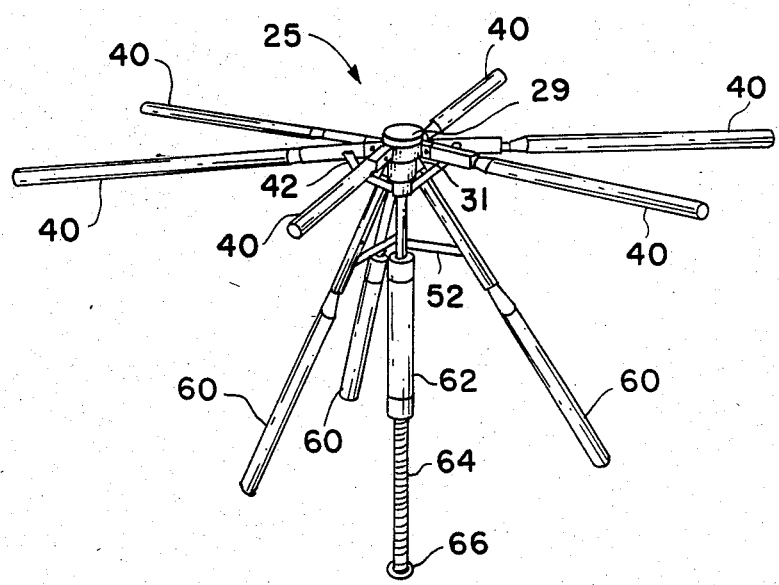
FIG. 2 is a view of one individual nodule cluster and attached struts employed in the construction of the antenna of FIG. 1 with partially illustrated struts being in the deployed or unfolded mode.

Referring now more particularly to FIGS. 2, 3, and 4, the details of an individual nodular element 25 will now be described. As shown therein, nodule 25 includes an elongated shaft 27, a hub 29 fixedly attached about shaft 27 at one end thereof. An integrally fixed tripod-like frame 31 depends from hub 29. Each of the legs on tripod frame 31 terminate into identical bifurcated ends 32 (FIGS. 2 and 4). Similarly, hub 29 is provided with six equally spaced bifurcated spokes 34. In the interest of clarity, only one bifurcated spoke 34 and one bifurcated tripod leg 32, and the attached components connected thereto, will be described. It is to be understood that each of the corresponding components illustrated in FIG. 2 are identical to those described with reference to FIGS. 3 and 4.

A strut end fitting 36 is hingedly connected at one end thereof within bifurcated spoke 34 via pivot pin 38. The other end of end fitting 36 is connected via threads or other conventional rigid connection to one end of a face strut segment 40. Each strut segment 40 is hingedly connected at its other end to an identical strut segment attached to a second nodular element as will be further explained hereinafter. A face synchronizer actuator link 42 is pivotally connected via pivot pin 44 to strut end fitting 36. A suitable elongated recessed area 45 is provided along the length of strut end fitting 36 to receive and permit relative movement of face synchronizer link 42 therein. The other end of face synchronizer actuator link 42 is pivotally connected via pivot pin 46 to one end of a slider 48, slidably retained about and relatively slidable with elongated shaft 27. The opposite end of slider 48 is also pivotally connected via pivot pin 50 to one end of core actuator and synchronizer link 52. The opposite end of core actuator synchronizer link 52 is pivotally connected via pivot pin 54 to a core strut end fitting 56. An elongated recessed area 55 is also provided along the length of core strut end fitting 56 to receive and permit relative movement of core synchronizer link 52 therein. Core strut end fitting 56 is pivotally connected at one end via pivot pin 58 to a bifurcated end 32 of tripod frame 31. The other end of core strut end fitting 56 is connected via a suitable threaded or otherwise conventional connection to one end of a core strut 60. Each core strut 60 is connected in like manner to a nodular element 25 disposed in reverse or inverted relationship to that illustrated in FIGS. 2–4, as will be further explained hereinafter.

Slider mechanism 48, as described hereinabove, is of tubular construction and slidably disposed about elongated shaft 27. A tubular damper 62 is also positioned on elongated shaft 27 and abuts against and is conventionally attached to slider 48. Damper 62 in the preferred embodiment is of conventional construction and is provided with a suitable hydraulic fluid therein with selected size orifices controlling the flow of fluid therein to thereby dampen or limit the damper movement velocity along elongated shaft 27. Hydraulic dampers of this type are well known in the art and additional details are omitted in the interest of brevity.

A passive coiled spring 64 is disposed about elongated shaft 27 between damper 62 and an enlarged fixed end 66 on shaft 27. Spring 64 serves as the passive distributed deployment energy to act against damper 62 to thereby regulate positive deployment velocity.

Proper design of the slider-actuator (synchronizer) links is possible to achieve synchronized operation between face and core struts at each node. Because the core struts extend between the truss face surfaces, kinematic loops are formed which provide synchronization and prevent one surface from opening faster than the other. Potential deployment sequences are schematically illustrated in the two-dimensional sketches of FIGS. 5 and 6. As shown therein, synchronized deployment would cause face surfaces 16 and 18 to unfold or deploy equally and result in the essentially parallel surface structures. As shown schematically in these FIGS. face strut segments 40 on adjacent nodes 25 in the same face surface are hingedly connected at the free ends thereof as designated by reference numeral 41 to form one face of each triangular component of the truss structure. Core struts 60 connect to two nodular elements 25 disposed in opposite face surfaces. As shown therein, the nodes in opposite faces 16 and 18 are reversed such that the elongated shaft end portion restraining spring 64 is directed toward the center of the truss structure. For essentially flat deployed surfaces nodular elements 25 would be designed to deploy struts 40 essentially 90° relative to the elongated shaft 27 and core struts 60 at essentially 35°. For parabolic reflective surfaces, the nodular elements are designed such that face struts 40 in the exterior face truss structure are deployed slightly less than 90° relative to elongated shaft 27 and the face struts 40 on the interior face are designed such that the face struts 40 are deployed slightly greater than 90° relative to elongated shaft 27 and, corresponding changes are obviously made in the angular relationship of core struts 60. In each case, the individual node elements on each surface are interchangeable with each other such that only two basic designs are required for a specific truss configuration. The peripheral nodes on each surface are of similar construction to those on that surface, but do not need or utilize a full complement of struts and are provided with an extra extension to accommodate restraint mechanisms as will be further explained hereinafter. The unsynchronized deployment schematically shown in FIG. 6 illustrates the uneven opening or deployment sequence for the various struts which could result in undue stresses on the various hinged components and/or "lock-up" at various points in the deploying structure.

Figure 7:
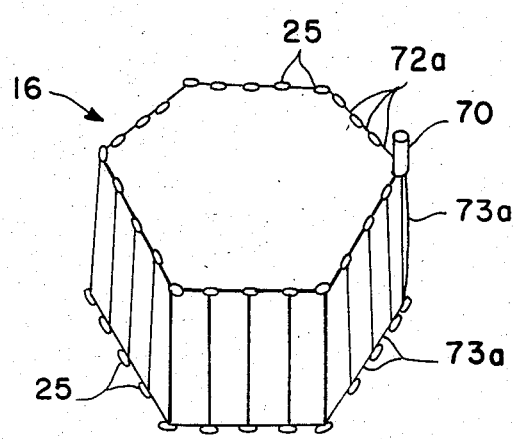
FIG. 7 is a part schematic view of the packaged or collapsed antenna structure and part of the restraint/deployment mechanism assist of the present invention.
Figure 8:
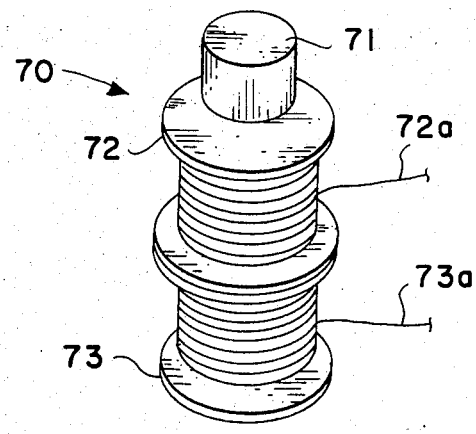
FIG. 8 is a more detailed view of part of the deployment assist mechanism shown in FIG. 7.
Figure 9:
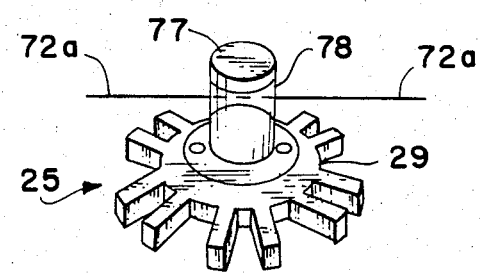
FIG. 9 is an enlarged partial view of one of the peripheral nodular elements shown in FIG. 7.

Referring now more particularly to FIGS. 7, 8 and 9, additional mechanism facilitating synchronous deployment of truss structure 16 will now be described. As shown in FIG. 7, truss structure 16 is folded or collapsed for compact stowage and transport to the site of use. When removed from the transport vehicle (Space Shuttle or the like) an external girth restraint/release mechanism 70 is remotely actuated in a conventional manner, e.g., radio signal, to start motor 71. Motor 71 is geared to spools 72 and 73 for rotation thereof at a controlled rate. Spools 72 and 73 contain tightly wound restraint cords or belts 72a and 73a, respectively. Belts 72a and 73a are formed of Kevlar®, or like high strength material, of adequate tensile strength to restrain the plurality of nodular elements folded with their respective springs 64 compressed. Each spool 72 and 73 contains approximately 300 meters of belting or enough to adequately extend around the periphery of the extended 100 meter reflector end 16. Belt 72a extends through an opening 78 in perpendicular extension 77 provided on hub 29 on the exposed end of peripheral nodular elements 25 of surface layer 20. Belt 73a extends through identical structure provided on the periphery of surface layer 18 and is not further described herein in the interest of clarity. Opening 78 is of adequate diameter to permit substantially unrestrained sliding movement of belt 72a therethrough. In assembling the structure, belt 72a is threaded through each individual perpendicular extension 77 and the free end of the belt tied or otherwise conventionally secured to the last extension 77 and adjacent to the first opening 78 receiving belt 72a.

When motor 71 is actuated, spools 72 and 73 turn at the predetermined controlled rate to unwind belt 72a and 73a, respectively, and thereby relieve the constraint on collapsed truss structure 16 and permit synchronous deployment thereof under the influence of the springs 64. The motor-spool-cord restraint/release mechanism may be employed in addition to, or in lieu of the individual dampers 62.

The operation of the invention is now believed apparent. As discussed hereinbefore the entire structure shown in FIG. 1 is compactly folded or collapsed to fit within the cargo bay of the space shuttle and during Earth orbit the assembly 10 is released from the shuttle vehicle via a suitable small rocket booster. When boosted into the desired orbit, masts 14, 14a and 14b, the attached truss and reflector end 16 and the appropriate portions of the antenna feed and electronic unit are released for individual deployment in response to a remote signal sent to unit 12. Removal of the restraints holding the various structures in packaged transport or collapsed condition are removed in a conventional manner and the truss structure 16 is deployed under the dampened control of the multiple springs 64. Reflective mesh layer 24 for surfaces 20 and 18 is stowed folded adjacent to the folded struts 40 and 60 and expands to cover the truss surfaces when deployed as shown in FIG. 1.

As discussed hereinabove, damper 62 in the preferred embodiment is a hydraulic fluid damper but any conventional damper structure such as for example, a ratchet type escapement mechanism may be employed. Also, the damper 62 may be assisted or replaced by providing for gradual release of the packaging restraint for truss structure 16 during deployment thereof and as discussed hereinbefore in reference to FIGS. 7-9. This gradual release, in the preferred embodiment, is in the form of a motor 71 actuator driving spool mechanism 72, 73 that releases or unwinds belt binders 72a and 73a for the truss package at the rate of deployment desired.

Where the hub spokes and tripod extensions have been described as bifurcated, it is to be understood that these components would be equally operable as tabs and the bifurcated fitting being provided on the parts connected thereto without departing from the principals of the present invention. Also, other conventional hinge type joints may be employed in lieu of the pivot pin connections described herein in reference to the preferred embodiment.

These and other modifications of the present invention will be readily apparent to those skilled in the art in the light of the above teachings. Thus, although the invention has been described relative to a specific embodiment thereof, it is to be understood that numerous modifications may be made therein without departing from the spirit and scope of the instant invention. It is therefore to be understood that within the scope of the appended claims, the invention may be practiced otherwise than as specifically described herein.

What is claimed as new and desired to be secured by Letters Patent of the United States is:

1. A synchronized collapsible truss structure comprising:

a first surface truss layer;

a second surface truss layer spaced from said first surface truss layer;

a core truss layer intermediate of said first and said second truss layers;

connection means attached to said first, second and core truss layers to form a unitary truss structure therewith;

said first and said second truss surface truss layers including a plurality of triangular strut frame members;

each said strut frame member being movably connected at one end thereof to said connection means;

said core truss layer including a plurality of angular core struts movably connected at each end thereof to said connection means;

said connection means consisting of a plurality of nodular joints, each said nodular joint including an elongated center shaft, hub means fixedly disposed adjacent and spaced from one end of said shaft, a plurality of hinged joints extending from and circumferentially disposed about said hub means, a plurality of surface strut frame members secured one each to said plurality of hinged joints, said plurality of hinged joints permitting movement of said attached surface strut frame members from a collapsed stowed position essentially parallel with said elongated center shaft to an expanded operative position wherein the attached surface strut frame members are disposed substantially 90° relative to said center shaft; and a synchronized actuation system for facilitating movement of said strut frame member and said angular core struts from the stowed folded position to the operative position forming the final truss geometry.

2. The synchronized collapsible truss structure of claim 1 including a tripod structure integral with and depending from said hub means;

said tripod including hinge connection structure between said angular core struts and said connection means.

3. The synchronized collapsible truss structure of claim 2 wherein said actuator system includes a slider mechanism slidably disposed on said elongated shaft and individual synchronizer link bars are provided and connected between said slider mechanism and each of said surface frame members and said angular core struts.

4. The synchronized collapsible truss structure of claim 3 including an actuator spring disposed circumferentially about said elongated shaft between said slider mechanism and the end of said shaft opposite to said hub means, said actuator spring serving to effect movement of said slider to facilitate strut movement from the stowed folded position to the operative position forming the final truss configuration.

5. The synchronized collapsible truss structure of claim 4 including a damper disposed on said elongated shaft between said actuator spring and said slider mechanism to serve as a synchronizer control for movement of said truss structure from a folded stowed position to a deployed operative truss configuration.

6. The synchronized collapsible truss structure of claim 3 wherein said synchronizer link bars are pivotally connected to said slider mechanism and to the individual surface frame members and angular core struts.

7. The synchronized collapsible truss structure of claim 5 wherein said damper is a hydraulic controlled piston-cylinder disposed about said elongated shaft.

8. The synchronized collapsible truss structure of claim 1 including an external girth restraint serving to maintain and restrain said collapsible truss structure in the compact, folded, transport position and controllable releasing means for said external girth restraint to permit synchronous deployment of said collapsible truss structure at the site of use thereof.

9. The synchronized collapsible truss structure of claim 8 wherein said external girth restraint includes a first restraint belt extending around the periphery of said first surface truss layer and a second restraint belt extending around the periphery of said second surface truss layer.

10. The synchronized collapsible truss structure of claim 9 wherein said controllable releasing means for said external girth restraint includes a pair of spools containing respective extensions of said first and said second restraint belts and a motor drive for turning said spools to permit controlled extension of said first and said second restraint belts as said collapsible truss structure is deployed.

* * * * *